(12) United States Patent
White et al.

(10) Patent No.: US 8,627,371 B2
(45) Date of Patent: Jan. 7, 2014

(54) SYSTEM AND METHOD OF APPLYING USER PROFILES AT A SET-TOP BOX DEVICE

(75) Inventors: Scott White, Austin, TX (US); James L. Cansler, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 569 days.

(21) Appl. No.: 12/029,866

(22) Filed: Feb. 12, 2008

(65) Prior Publication Data

US 2009/0204993 A1  Aug. 13, 2009

(51) Int. Cl.
*H04N 5/445* (2011.01)

(52) U.S. Cl.
USPC .......................................................... 725/46

(58) Field of Classification Search
None
See application file for complete search history.

(56) References Cited

U.S. PATENT DOCUMENTS

| | | | | |
|---|---|---|---|---|
| 6,088,722 | A * | 7/2000 | Herz et al. | 709/217 |
| 6,973,665 | B2 * | 12/2005 | Dudkiewicz et al. | 725/46 |
| 7,117,518 | B1 * | 10/2006 | Takahashi et al. | 725/86 |
| 7,370,343 | B1 * | 5/2008 | Ellis | 725/58 |
| 8,321,895 | B2 * | 11/2012 | Verhaegh et al. | 725/58 |
| 2003/0088872 | A1 * | 5/2003 | Maissel et al. | 725/46 |
| 2004/0143838 | A1 * | 7/2004 | Rose | 725/25 |
| 2005/0022229 | A1 * | 1/2005 | Gabriel et al. | 725/28 |
| 2005/0094033 | A1 | 5/2005 | Schoner et al. | |
| 2005/0160458 | A1 * | 7/2005 | Baumgartner | 725/46 |
| 2008/0046930 | A1 * | 2/2008 | Smith et al. | 725/46 |
| 2008/0115169 | A1 * | 5/2008 | Ellis et al. | 725/46 |

OTHER PUBLICATIONS

Digital Video Broadcasting (DVB); Implementation guidelines for the use of Video and Audio Coding in Broadcasting Applications based on the MPEG-2 Transport Stream (ETSI TS 101 154 V1.7.1), Annex B, Active Format Description; European Broadcasting Union, Jun. 2006.
Widescreen Signaling (WSS); Jack, Keith Application Note, AN9716.1; Aug. 1998; Copyright © Intersil Corporation.
"Digital Receiver Implementation Guidelines and DTG Implementation and User Group," Recommended Receiver Reaction to Aspect Ratio Signaling in Digital Video Broadcasting, Issue 1.2 .1; Feb. 2001.

* cited by examiner

*Primary Examiner* — Chenea Smith
(74) *Attorney, Agent, or Firm* — Guntin & Gust, PLC; Douglas Schnabel (57) ABSTRACT

A method of applying user profiles at a set-top box device includes receiving data associated with each of a plurality of user profiles at the set-top box device, the plurality of user profiles including a default profile and a supplemental profile. The method also includes automatically applying the supplemental profile to at least one set-top box action after a start time associated with the supplemental profile occurs. Further, the method includes automatically applying the default profile to the at least one set-top box action after an end time associated with the supplemental profile occurs.

20 Claims, 9 Drawing Sheets

SYSTEM AND METHOD OF APPLYING USER PROFILES AT A SET-TOP BOX DEVICE

FIELD OF THE DISCLOSURE

The present disclosure generally relates to applying user profiles at a set-top box device.

BACKGROUND

Television service providers offer a wide variety of content. Subscribers may have a desire to receive or interact with particular portions of such content, but not other portions. Hence, television receivers, such as set-top box devices, can be adapted to perform various actions, such as recording content designated by a subscriber or providing information related to available content.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some inventive features but not to others.

Figure 1:
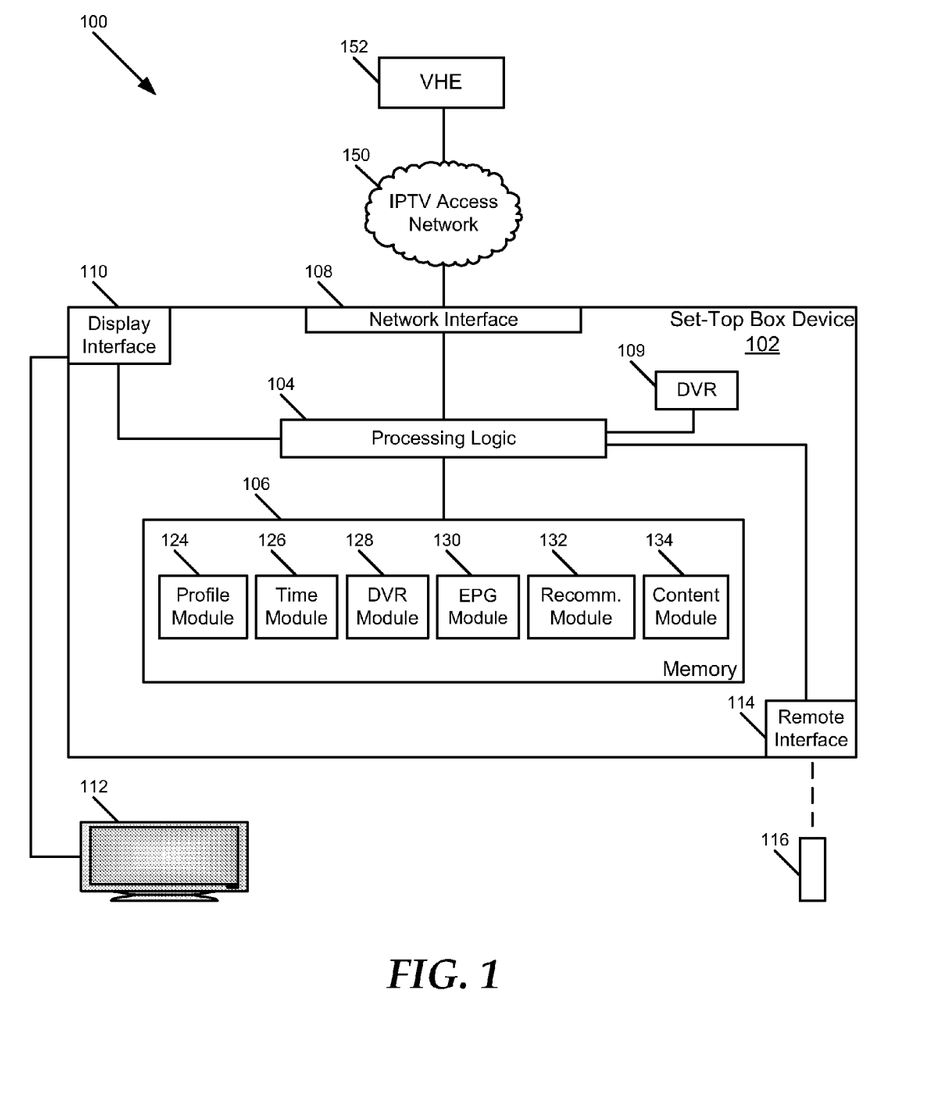
FIG. 1 is a block diagram illustrating a particular embodiment of a set-top box device.

FIG. 1 illustrates a particular embodiment of a set-top box device 102. The set-top box device 102 includes processing logic 104 and memory 106 accessible to the processing logic 104. The set-top box device 102 also includes a network interface 108 that is adapted to facilitate communication between the set-top box device 102 and a video head-end (VHE) 152 associated with a television service provider via an access network 150, such as a cable network, satellite network or Internet Protocol Television (IPTV) network. In addition, the set-top box device 102 includes a display interface 110 adapted to facilitate communication between the set-top box device 102 and a display device, such as the television 112. The set-top box device 102 also includes a remote interface 114 that is adapted to communicate with a remote control device 116. Further, the set-top box device 102 can include a digital video recorder (DVR) 109. In alternative embodiments, the set-top box device 102 can be coupled to an external DVR.

In a particular embodiment, the memory 106 includes a plurality of modules 124-134. The modules 124-134 can include computer instructions that are readable and executable by the processing logic 104 to implement various functions of the set-top box device 102 with respect to applying user profiles. For example, the modules 124-134 can represent various aspects of one or more software applications, operating systems, or other computer programs. In other embodiments, the modules 124-134 can be implemented as hardware logic or a combination of hardware logic and computer instructions.

Figure 7:
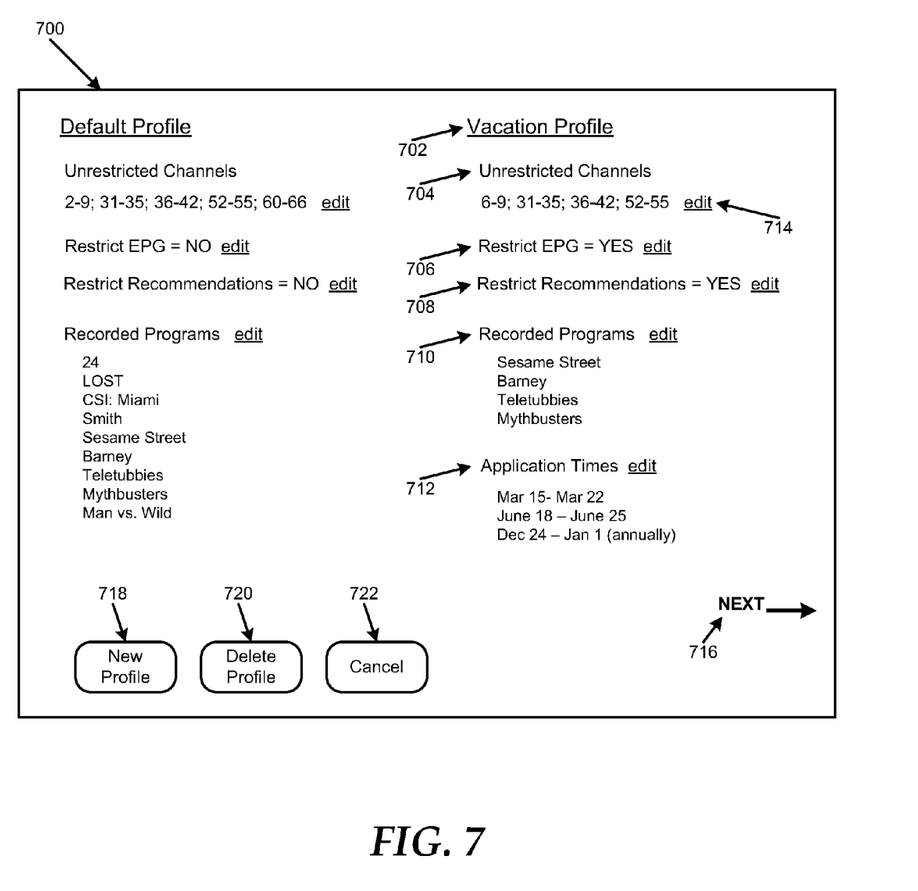
FIG. 7 is a diagram illustrating a particular embodiment of a graphical user interface (GUI) to receive data associated with user profiles at a set-top box device.
Figure 8:
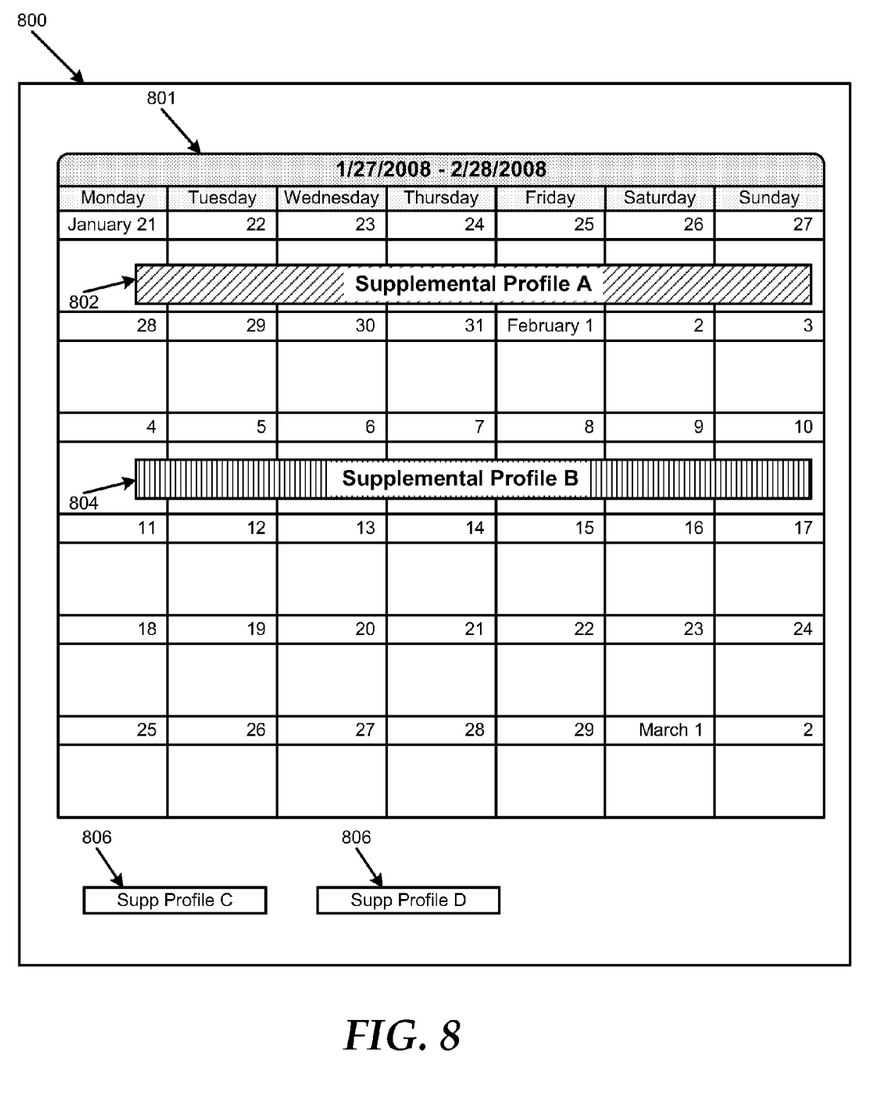
FIG. 8 is a diagram illustrating a second particular embodiment of a graphical user interface (GUI) to receive data associated with user profiles at a set-top box device.

The memory 106 includes a profile module 124 that is executable by the processing logic 104 to receive and store data associated with a plurality of user profiles. The plurality of user profiles includes a default profile and at least one supplemental profile, such as a vacation profile, a holiday profile, a weekend profile, a weekday profile, a daytime profile, a prime time profile, a night profile, another time-based profile, or any combination thereof. In one example, the profile module 124 is executable by the processing logic 104 to provide a graphical user interface (GUI) at the display device 112 and to receive profile data from a user via the GUI. Examples of GUIs that are adapted to receive profile data from a user are illustrated in FIG. 7-8.

Profile data can include, for example, data indicating one or more channels that are restricted for viewing; data indicating one or more channels that are not restricted for viewing; data indicating whether electronic program guide (EPG) data is to be restricted based on channel restrictions; data indicating whether recommendations of television content are to be provided; data indicating whether recommendations of television content are to be restricted based on channel restrictions; data indicating one or more television programs to be recorded; data indicating one or more restricted genres of television content; data indicating one or more restricted television content ratings; or any combination thereof.

In addition, the profile data includes data indicating one or more times at which each supplemental profile is to be applied to one or more actions of the set-top box device, such as recording television content, providing EPGs in response to EPG requests, restricting television content, providing television content recommendations, responding to channel requests, other actions, or any combination thereof. Such times can include a start time and an end time associated with each supplemental profile, such as a start time and en end time corresponding to a recurrent time period, such as a daily, weekly, monthly, or annual time period; a non-recurrent time period; or any combination thereof.

The memory 106 includes a time module 126 that is executable by the processing logic 104 to determine whether a starting time associated with a supplemental profile has occurred, such as a particular day, date, other time, or any combination thereof, and to make the supplemental profile active when the starting time has occurred. Additionally, the time module 126 is executable by the processing logic 104 to determine whether a starting time associated with a supplemental profile has occurred and to automatically make a default profile active when the end time has occurred. Alternatively, when the end time of a first supplemental profile coincides with a start time of a second supplemental profile, the time module 126 is executable by the processing logic 104 to make the second supplemental profile active when the end time of the first supplemental profile has occurred. The set-top box device 102 is adapted to apply an active profile to one or more set-top box actions according to information included in the active profile.

In an illustrative embodiment, the memory 106 includes a DVR module 128 that is executable by the processing logic 104 to record television content indicated by an active profile at the DVR 109 or at a DVR that is external to the set-top box device 102. For example, the DVR module 128 can be executable by the processing logic 104 to record one or more television programs indicated by a default profile until a supplemental profile becomes active (i.e., a start time associated with the supplemental profile occurs). The DVR module 128 is executable by the processing logic 104 to record one or more television programs indicated by the supplemental profile after the start time occurs and to not record any television programs that are not indicated by the supplemental profile while the supplemental profile is active. The DVR module 128 is executable by the processing logic 104 to automatically record the television program(s) indicated by the default profile when the supplemental profile is no longer active (i.e., after the end time associated with the supplemental profile occurs). Alternatively, when the end time of a first supplemental profile coincides with a start time of a second supplemental profile, the DVR module 128 is executable by the processing logic 104 to record one or more television programs indicated by the second supplemental profile until an end time associated with the second supplemental profile occurs.

Further, the memory 106 includes an EPG module 130 that is executable by the processing logic 104 to receive EPG data from the VHE 152 and to provide an EPG to the display device 112 in response to an EPG request. For example, the EPG module 130 can be executable by the processing logic 104 to provide an EPG that includes unrestricted channels indicated by a default profile while the default profile is active and to provide an EPG that includes unrestricted channels indicated by a supplemental profile when the supplemental profile is active. In one embodiment, the EPG module 130 can be executable by the processing logic 104 to receive data corresponding to an EPG from the VHE 152 and to modify the EPG to include only unrestricted channels indicated by the active profile. In another embodiment, the EPG module 130 can be executable by the processing logic 104 to request EPG data associated with unrestricted television channels indicated by an active profile and to generate an EPG that includes only the unrestricted channels.

In addition, the memory 106 includes a recommendations module 132 that is executable by the processing logic 104 to determine whether an event has occurred in response to which the set-top box device 102 is to provide one or more television program recommendations. For example, the recommendations module 132 can be executable by the processing logic 104 determine that the set-top box device has received a request for one or more television program recommendations, that a user has accessed a video-on-demand channel, that a user has accessed a pay-per-view preview channel, that a user has requested an EPG, or that another program recommendation event has occurred. The recommendations module 132 is executable by the processing logic 104 to send profile information associated with an active profile to the VHE 152 and to receive data from the VHE 152 indicating one or more television program recommendations, where the television program recommendation(s) are based on the profile information associated with the active profile. The recommendations module 132 is executable by the processing logic 104 to send the television program recommendation(s) to the display device 112.

Moreover, the memory includes a content module 134 that is executable by the processing logic 104 to receive channel requests via the remote control interface 114, for example. The content module 134 is executable by the processing logic 104 to determine whether a requested channel is indicated as unrestricted according to an active profile. The content module 134 is executable by the processing logic 104 to receive television content associated with an unrestricted channel from the VHE 152 and to send the television content to the display device 112. The content module 134 is also executable by the processing logic 104 to deny access to a channel that is not indicated as unrestricted according to an active profile.

Figure 2:
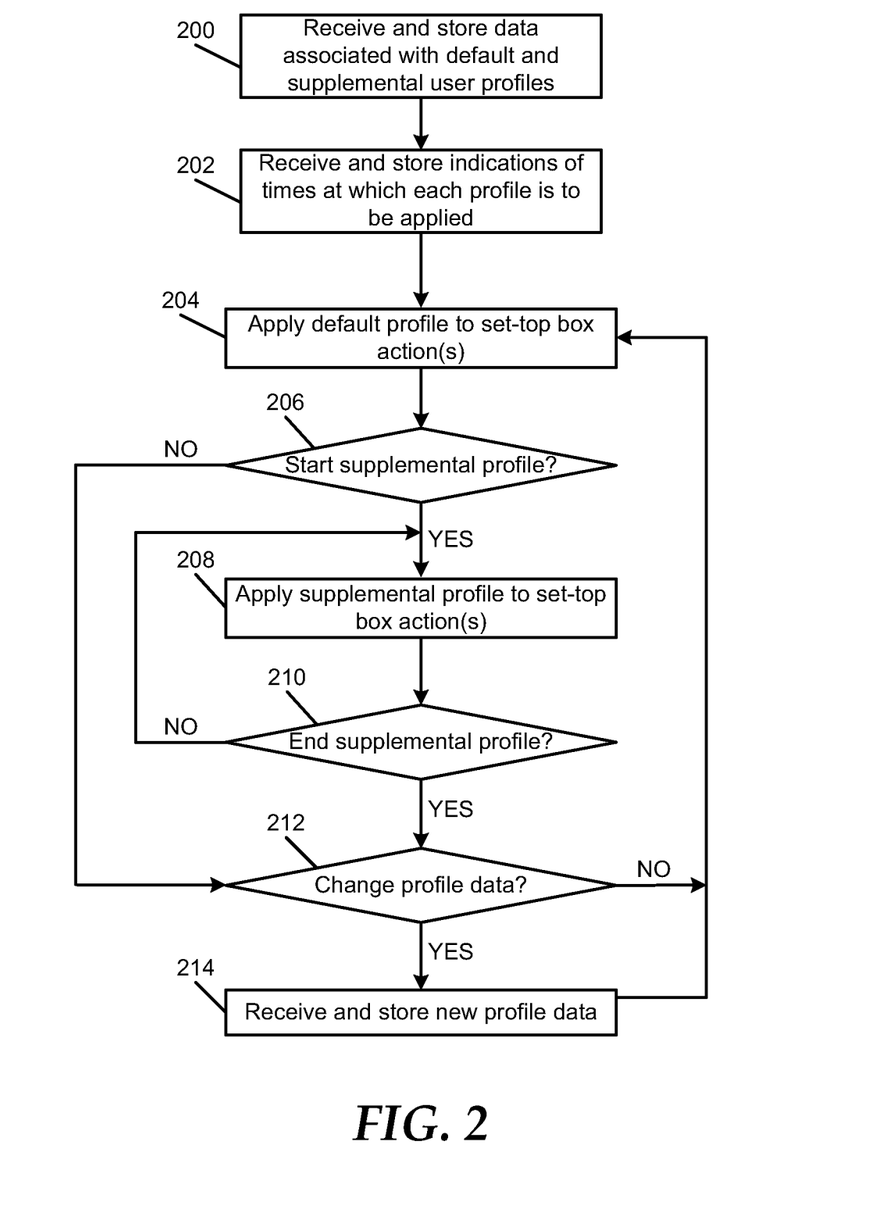
FIG. 2 is a flow diagram illustrating a particular embodiment of a method of applying user profiles at a set-top box device.

FIG. 2 illustrates a particular embodiment of a method of applying user profiles at a set-top box device. At block 200, a set-top box device receives and stores data associated with a plurality of user profiles that includes a default profile and at least one supplemental profile, such as a vacation profile, a holiday profile, a weekend profile, a weekday profile, a daytime profile, a prime time profile, a night profile, another time-based profile, or any combination thereof. In one example, the set-top box device can provide a GUI at a display device coupled to the set-top box device, and a user can enter profile data by interacting with the GUI via a remote control device, for example. An example of a GUI to receive profile data from a user is illustrated in FIG. 7.

Profile data can include, for example, data indicating one or more channels that are restricted for viewing; data indicating one or more channels that are not restricted for viewing; data indicating whether EPG data is to be restricted based on channel restrictions; data indicating whether recommendations of television content are to be provided; data indicating whether recommendations of television content are to be restricted based on channel restrictions; data indicating one or more television programs to be recorded; data indicating one or more restricted genres of television content; data indicating one or more restricted television content ratings; or any combination thereof.

Moving to block 202, the set-top box device receives and stores data indicating one or more times at which each supplemental profile is to be applied to one or more actions of the set-top box device. Such times can include a recurrent time period, such as a daily, weekly, monthly, or annual time period; a non-recurrent time period; or any combination thereof. Proceeding to block 204, the set-top box device applies the default profile to one or more actions of the set-top box device, such as recording television content, providing EPGs in response to EPG requests, restricting television content, providing television content recommendations, responding to channel requests, other set-top box actions, or any combination thereof.

Continuing to decision node 206, the set-top box device determines whether a starting time associated with a supplemental profile has occurred, such as a particular day, date, other time, or any combination thereof. If the set-top box device determines that a starting time associated with a supplemental profile has not occurred, the method can advance to decision node 212. Conversely, if the set-top box device determines that a starting time associated with a supplemental profile has occurred, the method advances to block 208, and the set-top box device applies the supplemental profile to one or more set-top box actions, as stipulated by the supplemental profile.

At decision node 210, the set-top box device determines whether an end time associated with the supplemental profile has occurred. If the end time has not occurred, the method returns to block 208, and the set-top box device continues applying the supplemental profile to the set-top box action(s) for which the user has provided data in the supplemental profile. On the other hand, if the end time associated with the supplemental profile has occurred, the method can move to decision node 212, and the set-top box device can determine whether it has received a request to change data associated with the default profile, the at least one supplemental profile, or any combination thereof. If the set-top box device has not received a request to change profile data, the method returns to block 204, and the set-top box device automatically reverts to applying the default profile to the set-top box action(s) for which the user has provided data in the default profile. Whereas, if the set-top box device has received a request to change profile data, the method proceeds to block 214, and the set-top box device receives and stores new profile data related to the default profile, the at least one supplemental profile, or a combination thereof. The method can then return to block 204.

Figure 3:
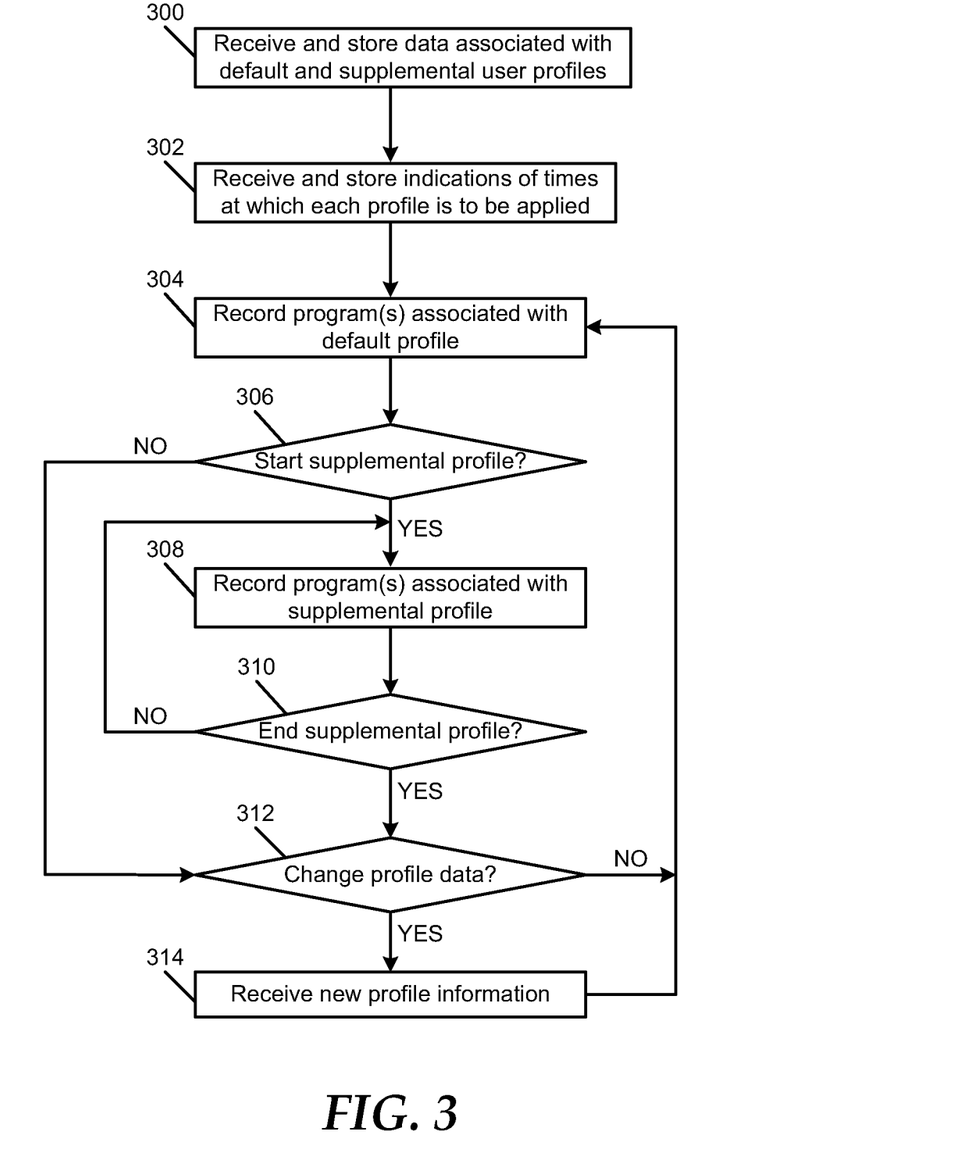
FIG. 3 is a flow diagram illustrating a second particular embodiment of a method of applying user profiles at a set-top box device.

FIG. 3 illustrates a second particular embodiment of a method of applying user profiles at a set-top box device. At block 300, a set-top box device receives and stores data associated with a plurality of user profiles that includes a default profile and at least one supplemental profile. In one example, the set-top box device can provide a GUI at a display device coupled to the set-top box device, and a user can enter profile data by interacting with the GUI via a remote control device, for example. An example of a GUI to receive profile data from a user is illustrated in FIG. 7.

Moving to block 302, the set-top box device receives and stores data indicating one or more times at which each supplemental profile is to be applied to one or more actions of the set-top box device, such as recording television content. Proceeding to block 304, the set-top box device records one or more television programs associated with the default profile. For instance, while the default profile is active at the set-top box device, the set-top box device can record (or instruct another device to record) one or more programs on a regular basis, such as episodes associated with a weekly series.

Continuing to decision node 306, the set-top box device determines whether a starting time associated with a supplemental profile has occurred, such as a particular day, date, other time, or any combination thereof. If the set-top box device determines that a starting time associated with a supplemental profile has not occurred, the method can advance to decision node 312. Conversely, if the set-top box device determines that a starting time associated with a supplemental profile has occurred, the method advances to block 308, and the set-top box device begins recording one or more television programs associated with the supplemental profile. In a particular embodiment, while the supplemental profile is active at the set-top box device, the set-top box device ceases recording any television program(s) associated with the default profile that are not also associated with the supplemental profile.

At decision node 310, the set-top box determines whether an end time associated with the supplemental profile has occurred. If the end time has not occurred, the method returns to block 308, and the set-top box device continues applying the supplemental profile to the set-top box action(s), such as recording television content. On the other hand, if the end time associated with the supplemental profile has occurred, the method can move to decision node 312, and the set-top box device can determine whether it has received a request to change data associated with the default profile, the at least one supplemental profile, or any combination thereof. If the set-top box device has not received a request to change profile data, the method returns to block 304, and the set-top box device automatically reverts to applying the default profile to one or more set-top box actions, such as recording television content. Whereas, if the set-top box device has received a request to change profile data, the method proceeds to block 314, and the set-top box device receives and stores new profile data. The method can then return to block 304.

Figure 4:
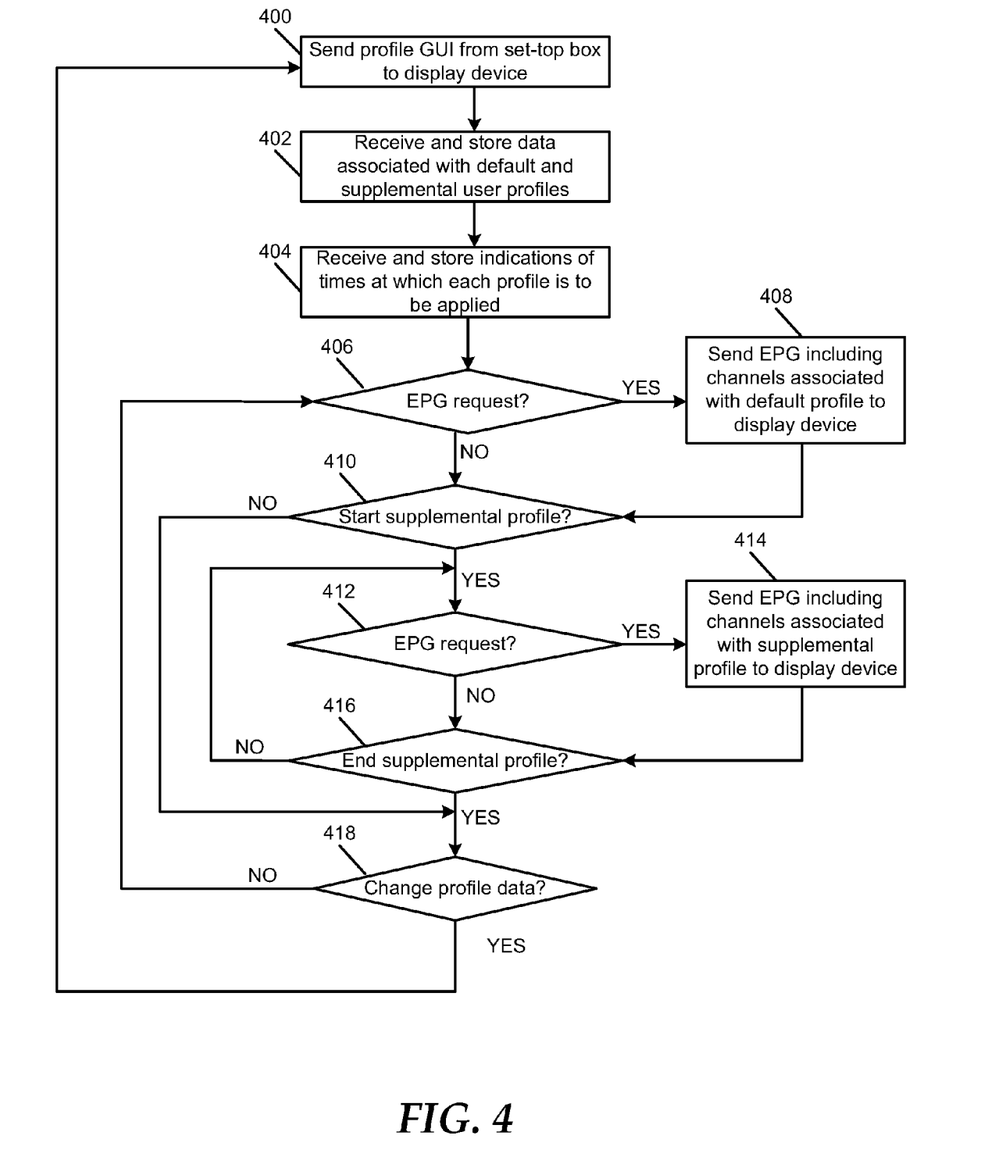
FIG. 4 is a flow diagram illustrating a third particular embodiment of a method of applying user profiles at a set-top box device.

FIG. 4 illustrates a third particular embodiment of a method of applying user profiles at a set-top box device. At block 400, a set-top box device sends a profile GUI to a display device. The profile GUI can include one or more screens and is adapted to receive data from a user related to creating a profile, changing a profile, times at which various profiles are to be applied by the set-top box device. Moving to block 402, the set-top box device receives and stores data associated with a default profile and at least one supplemental profile. In one example, the set-top box device receives the data via the GUI. Proceeding to block 404, the set-top box device receives and stores data indicating one or more times at which each supplemental profile is to be applied to one or more actions of the set-top box device, such as providing an EPG.

Continuing to decision node 406, the set-top box device determines whether it has received an EPG request. For instance, the set-top box device can receive data corresponding to a selection of an EPG button or other indicator at a remote control device communicating with the set-top box device. If the set-top box device has not received an EPG request, the method advances to decision node 410. Conversely, if the set-top box device has received an EPG request, the method advances to block 408, and the set-top box device sends an EPG that includes unrestricted channels associated with the default profile to a display device coupled to the set-top box device. The method then advances to decision node 410.

At decision node 410, the set-top box device determines whether a starting time associated with a supplemental profile has occurred. If the set-top box determines that a starting time associated with a supplemental profile has not occurred, the method can move to decision node 418. Conversely, if the set-top box determines that a starting time associated with a supplemental profile has occurred, the method moves to decision node 412, and the set-top box device determines whether it has received an EPG request. If the set-top box device has not received an EPG request while the supplemental profile is active at the set-top box device, the method proceeds to decision node 416. Whereas, if the set-top box device has received an EPG request, the method proceeds to block 414, and the set-top box device sends an EPG that includes unrestricted channels associated with the supplemental profile to the display device. The method then continues to decision node 416.

At decision node 416, the set-top box determines whether an end time associated with the supplemental profile has occurred. If the end time has not occurred, the method returns to decision node 412, and the set-top box device continues applying the supplemental profile to one or more set-top box action(s), such as providing an EPG. On the other hand, if the end time associated with the supplemental profile has occurred, the method can move to decision node 418, and the set-top box device can determine whether it has received a request to change data associated with the default profile, the at least one supplemental profile, or any combination thereof. If the set-top box device has not received a request to change profile data, the method returns to decision node 406, and the set-top box device automatically reverts to applying the default profile to one or more set-top box actions, such as providing an EPG. Whereas, if the set-top box device has received a request to change profile data, the method returns to block 400, and the set-top box device can send the profile GUI, or a portion thereof, to the display device.

Figure 5:
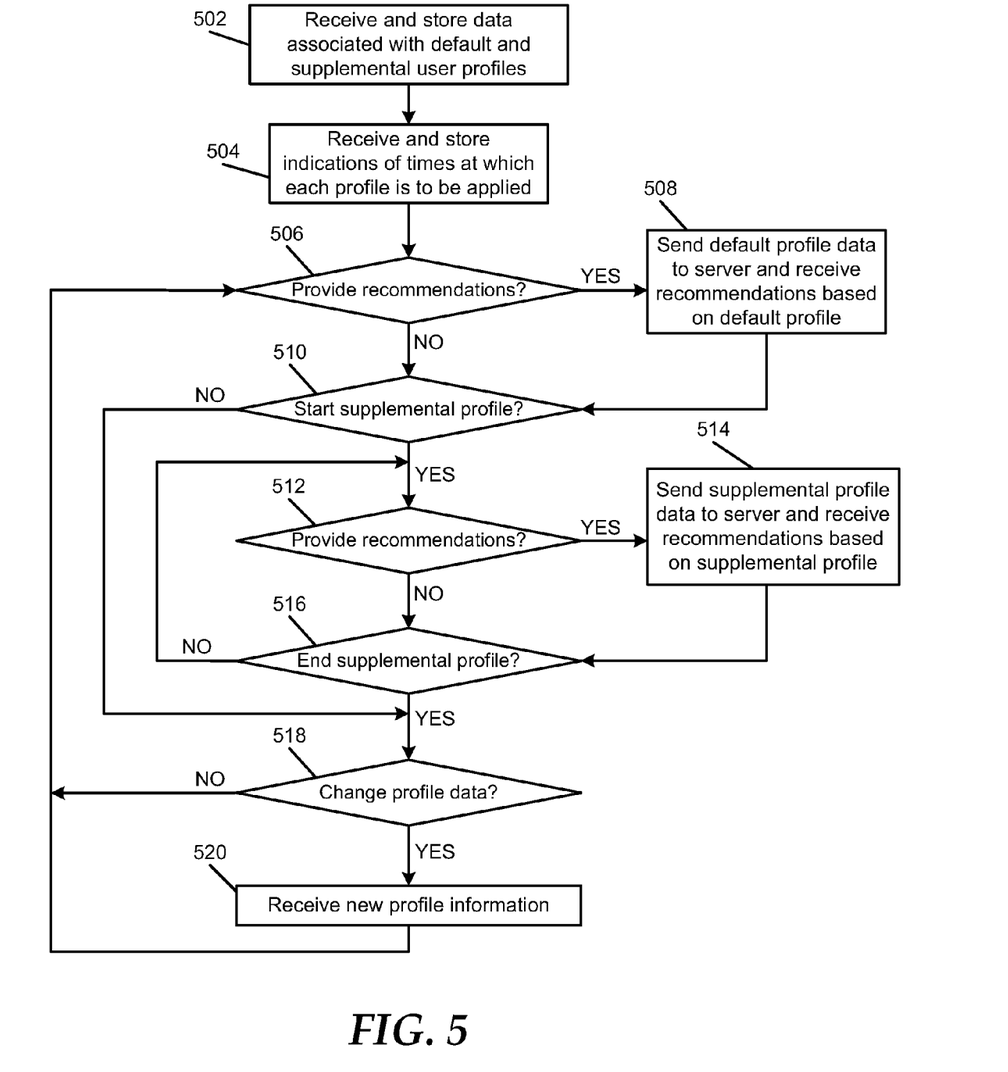
FIG. 5 is a flow diagram illustrating a fourth particular embodiment of a method of applying user profiles at a set-top box device.

FIG. 5 illustrates a fourth particular embodiment of a method of applying user profiles at a set-top box device. At block 502, a set-top box device receives and stores data associated with a default profile and at least one supplemental profile. Moving to block 504, the set-top box device receives and stores data indicating one or more times at which each supplemental profile is to be applied to one or more actions of the set-top box device, such as providing television program recommendations.

Proceeding to decision node 506, the set-top box device determines whether it is to provide one or more television program recommendations. For instance, the set-top box device can determine that the set-top box device has received a request for one or more television program recommendations, that a user has accessed a video-on-demand channel, that a user has accessed a pay-per-view preview channel, that a user has requested an EPG, or that another program recommendation event has occurred in response to which the set-top box device is to provide one or more television program recommendations. If such an event has not occurred, the method advances to decision node 510. Otherwise, the method advances to block 508, and the set-top box device sends information associated with the default profile to a recommendation system at a video head-end associated with a television service provider. Further, the set-top box device receives recommendations that are based on the default profile information. The method then advances to decision node 510.

At decision node 510, the set-top box device determines whether a starting time associated with a supplemental profile has occurred. If the set-top box determines that a starting time associated with a supplemental profile has not occurred, the method can move to decision node 518. Conversely, if the set-top box determines that a starting time associated with a supplemental profile has occurred, the method moves to decision node 512, and the set-top box device determines whether it is to provide one or more television program recommendations. If a program recommendation event has not occurred while the supplemental profile is active at the set-top box device, the method proceeds to decision node 516. Whereas, if a program recommendation event has occurred, the method proceeds to block 514, and the set-top box device sends information associated with the supplemental profile to the recommendation system and receives one or more television program recommendations that are based on the supplemental profile information. The method then continues to decision node 516.

At decision node 516, the set-top box determines whether an end time associated with the supplemental profile has occurred. If the end time has not occurred, the method returns to decision node 512, and the set-top box device continues applying the supplemental profile to one or more set-top box actions, such as providing television program recommendations. On the other hand, if the end time associated with the supplemental profile has occurred, the method can move to decision node 518, and the set-top box device can determine whether it has received a request to change data associated with the default profile, the at least one supplemental profile, or any combination thereof. If the set-top box device has not received a request to change profile data, the method returns to decision node 506, and the set-top box device automatically reverts to applying the default profile to one or more set-top box action(s), such as providing one or more television program recommendations. Whereas, if the set-top box device has received a request to change profile data, the method proceeds to block 520, and the set-top box device receives new profile data. The method can then return to decision node 506.

Figure 6:
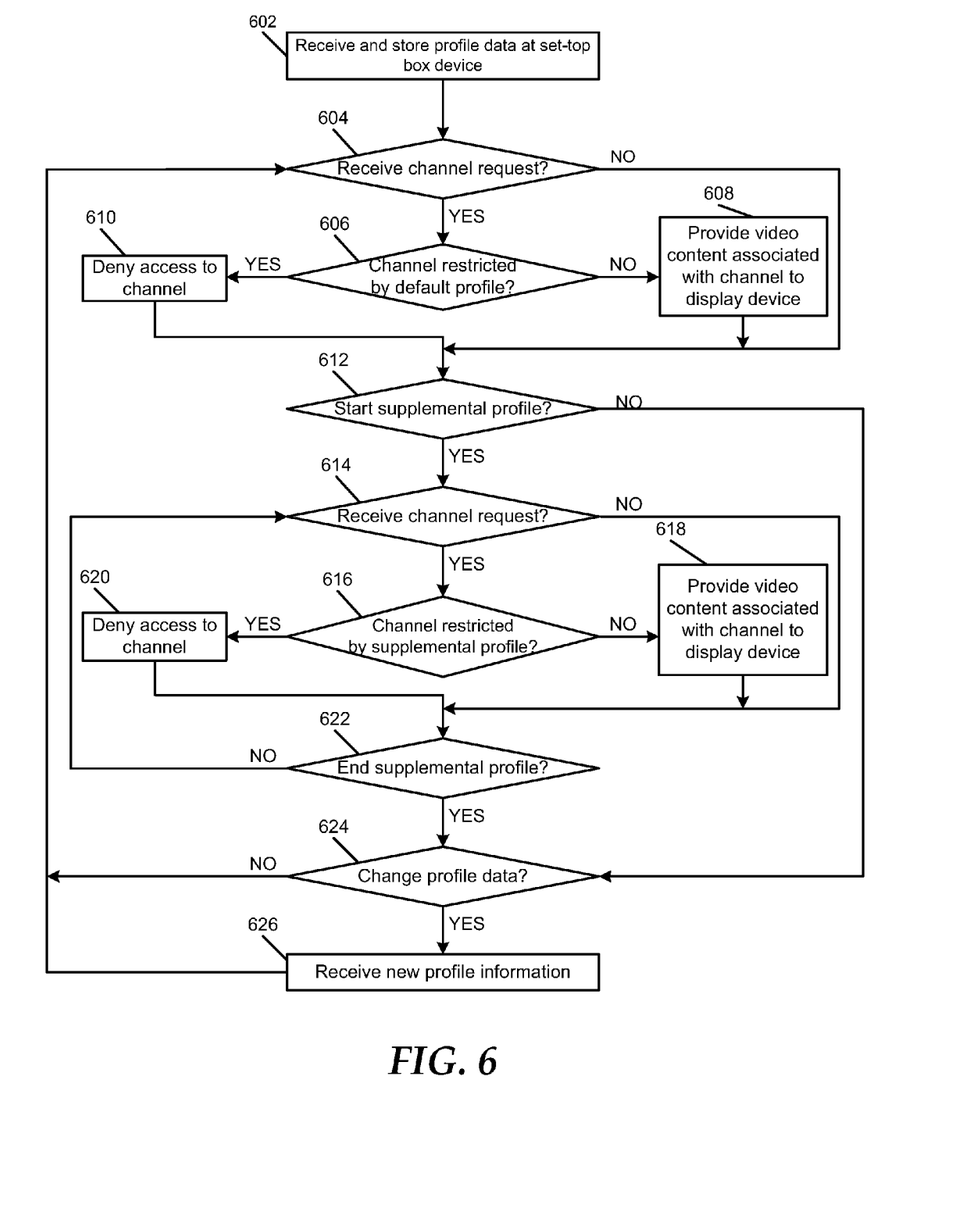
FIG. 6 is a flow diagram illustrating a fifth particular embodiment of a method of applying user profiles at a set-top box device.

FIG. 6 illustrates a fifth particular embodiment of a method of applying user profiles at a set-top box device. At block 602, a set-top box device receives and stores profile data from a user. The profile data includes data associated with a default profile and at least one supplemental profile and data indicating one or more times at which each supplemental profile is to be applied to one or more actions of the set-top box device, such as responding to television channel requests.

Proceeding to decision node 604, the set-top box device determines whether it has received a channel request. If the set-top box device has not received a channel request, the method advances to decision node 612. Conversely, if the set-top box device has received a channel request, the method continues to decision node 606, and the set-top box device determines whether a requested channel is restricted according to the default profile. If the channel is not restricted according to the default profile, the method moves to block 608, and the set-top box device provides video content associated with the channel to a display device. Whereas, if the channel is restricted according to the default profile, the method moves to block 610, and the set-top box device denies access to the requested channel.

Advancing to decision node 612, the set-top box determines whether a starting time associated with a supplemental profile has occurred. If the set-top box determines that a starting time associated with a supplemental profile has not occurred, the method can move to decision node 624. Conversely, if the set-top box determines that a starting time associated with a supplemental profile has occurred, the method moves to decision node 614, and the set-top box device determines whether it has received a channel request. If a channel request has not been received while the supplemental profile is active at the set-top box device, the method proceeds to decision node 622. Whereas, if a channel request has been received, the method proceeds to block 616, and the set-top box device determines whether a requested channel is restricted according to the supplemental profile. If the channel is not restricted according to the supplemental profile, the method moves to block 618, and the set-top box device provides video content associated with the channel to a display device. Whereas, if the channel is restricted according to the supplemental profile, the method moves to block 620, and the set-top box device denies access to the requested channel.

At decision node 622, the set-top box determines whether an end time associated with the supplemental profile has occurred. If the end time has not occurred, the method returns to decision node 614, and the set-top box device continues applying the supplemental profile to one or more set-top box actions, such as responding to television channel requests. On the other hand, if the end time associated with the supplemental profile has occurred, the method can move to decision node 624, and the set-top box device can determine whether it has received a request to change data associated with the default profile, the at least one supplemental profile, or any combination thereof. If the set-top box device has not received a request to change profile data, the method returns to decision node 604, and the set-top box device automatically reverts to applying the default profile to one or more set-top box action(s), such as responding to television channel requests. Whereas, if the set-top box device has received a request to change profile data, the method proceeds to block 626, and the set-top box device receives new profile data. The method can then return to decision node 604.

In some embodiments, the methods disclosed herein can be performed as described with reference to FIGS. 2-6. In other embodiments, aspects of the methods can be performed in alternative sequences or simultaneously. In addition, a set-top box device can apply a default profile and at least one supplemental profile to a plurality of set-top box actions, such that the set-top box device performs a plurality of the methods described in FIGS. 2-6 simultaneously.

FIG. 7 illustrates a particular embodiment of a GUI 700 to receive data associated with user profiles at a set-top box device. The GUI 700 includes a plurality of profiles 702, such as a default profile and a vacation profile. In an illustrative embodiment, each profile can include channel data 704 indicating one or more television channels that are not restricted according to the profile; EPG data 706 indicating whether EPG information provided by the set-top box device in response to EPG requests is to be restricted to reflect only the unrestricted channels 704; recommendation data 708 indicating whether television program recommendations are to be restricted based on the profile; recording data 710 indicating one or more television programs that are to be recorded when the profile is active at the set-top box device; or any combination thereof. In addition, each profile 702 includes time data 712 indicating one or more times at which the profile 702 is to be applied to one or more set-top box actions.

In a particular embodiment, each portion of data 704-712 associated with each profile 702 can be edited by selecting an "edit" indicator 714 associated with the portion of data. Additional profiles can be viewed by selecting a next indicator 716 or similar indicator to move to one or more additional screens that display data associated with such additional profiles. In an illustrative embodiment, the GUI 700 can include other selectable indicators, such as a first indicator 718 related to an option to create a new profile; a second indicator 720 related to an option to delete a profile; a third indicator 722 related to a cancel option or similar option to stop displaying the GUI 700.

FIG. 8 illustrates a second particular embodiment of a GUI 800 to receive data associated with user profiles at a set-top box device. The GUI 800 includes a calendar interface 801 adapted to receive user inputs regarding times at which various profiles are to be applied to set-top box actions. For example, a user can indicate that a first supplemental profile is to be applied by a set-top box device during a particular week (or other period of time), and the GUI 800 can display a graphic indicator 802 of the first supplemental profile extending to the dates corresponding to the particular week. A user can indicate that a second supplemental profile is to be applied by the set-top box device during another particular week (or other period of time), and the GUI 800 can display a second graphic indicator 804 of the second supplemental profile extending to the dates corresponding to the other particular week. Indicators of supplemental profiles can be colored or otherwise visually distinct from one another. In one embodiment, dates or other times during which a default profile is to be automatically applied can be left blank or can be indicated by a default profile indicator, a particular color, or another visual indication.

Data indicating times at which the set-top box device is to apply a profile can be received in a variety of ways. For example, a user can use a remote control device to select and drag an indicator 806 of a profile onto the calendar interface 801 and can select and drag ends of an indicator of the profile to include dates during which the profile is to be applied. In other embodiments, the user can enter dates during which the profile is to be applied, such as the time data 712 illustrated in FIG. 7, and the GUI 800 can display an indicator of the profile that includes the dates via the calendar interface 801.

Figure 9:
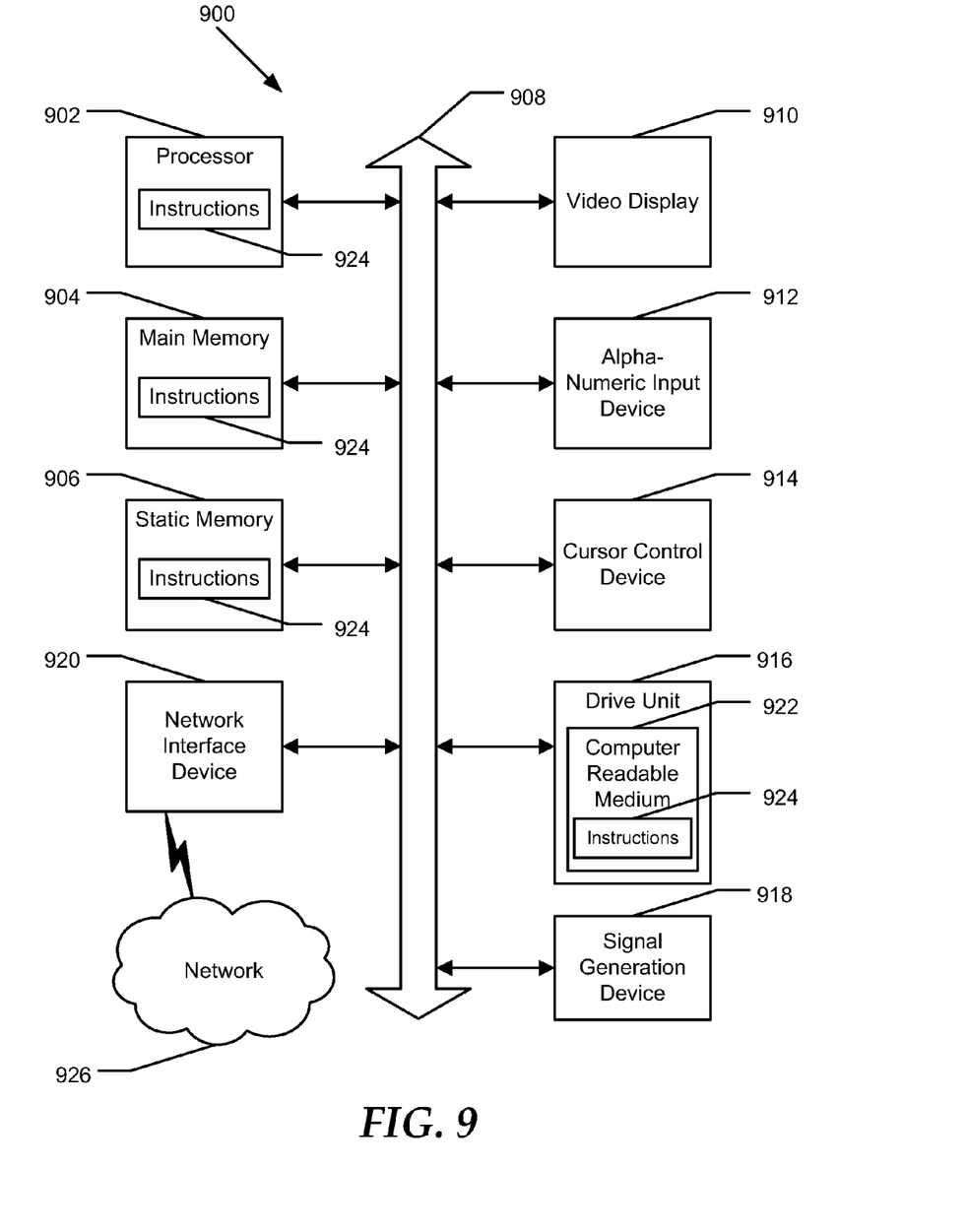
FIG. 9 is a block diagram illustrating a particular embodiment of a general computer system.

FIG. 9 shows an illustrative embodiment of a general computer 900 including a set of instructions that can be executed to cause the computer system to perform any one or more of the methods or computer based functions disclosed herein. The computer system 900 may operate as a standalone device or may be connected, e.g., using a network, to other computer systems or peripheral devices. In an illustrative embodiment, such standalone and peripheral devices can include, for example, set-top box devices, video head-end devices, digital video recorders, or any combination thereof, as illustrated in FIG. 1.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
  receiving, by a set-top box device comprising a processor, data associated with each of a plurality of user profiles, wherein two of the plurality of user profiles comprise a default profile and a supplemental profile;
  applying, by the set-top box device, the default profile, wherein the default profile causes a first set-top box action that configures an electronic programming guide according to a default configuration of restricted and unrestricted channels responsive to an occurrence of an event;

receiving, by the set-top box device, a request to activate the supplemental profile during a given time period having a start time and an end time based on input data corresponding to a selection, a placement, and an adjustment of a graphical indicator in a calendar interface of a graphical user interface, wherein the graphical indicator is a representation of the supplemental profile;

applying, by the set-top box device, the supplemental profile when the start time associated with the supplemental profile occurs, wherein the supplemental profile causes a second set-top box action that configures the electronic programming guide according to a supplemental configuration of restricted and unrestricted channels responsive to the occurrence of the event, wherein the default configuration and the supplemental configuration differ;

terminating, by the set-top box device, the default profile responsive to applying the supplemental profile when the start time occurs, thereby discontinuing the electronic programming guide being configured according to the default configuration;

restoring, by the set-top box device, the default profile after the end time associated with the supplemental profile occurs, thereby restoring the electronic programming guide being configured according to the default configuration, and discontinuing the electronic programming guide being configured according to the supplemental configuration;

determining, by the set-top box device, if the event occurred;

initiating, by the set-top box device, one of the first set-top box action or the second set-top box action according to an active one of the default profile or the supplemental profile and responsive to determining that the event occurred; and terminating, by the set-top box device, the first set-top box action previously initiated while the default profile was active responsive to the supplemental profile being activated, and the first set-top box action not being associated with the supplemental profile.

2. The method of claim 1, wherein the applying of the default profile comprises applying the default profile before the start time associated with the supplemental profile.

3. The method of claim 1, comprising:
receiving a request at the set-top box device to input profile data; and
providing a graphical user interface at a display device coupled to the set-top box device,
wherein the data associated with the plurality of user profiles is received via the graphical user interface.

4. The method of claim 1, wherein the data associated with each of the plurality of user profiles comprises data indicating a first channel that is restricted for viewing, data indicating a second channel that is not restricted for viewing, data indicating whether electronic program guide data is to be restricted based on channel restrictions, data indicating whether recommendations of television content are to be provided, data indicating whether recommendations of television content are to be restricted based on channel restrictions, data indicating a television program to be recorded, data indicating a restricted genre of television content, data indicating a restricted television content rating, or any combination thereof.

5. The method of claim 1, comprising receiving, by the set top box device, timing data indicating the start time and the end time of the supplemental profile.

6. The method of claim 5, comprising providing a graphical calendar interface at a display device coupled to the set-top box device, wherein the timing data is received via the graphical calendar interface.

7. The method of claim 1, comprising:
receiving, by the set top box device, new data associated with one of the plurality of user profiles; and
updating at the set top box the one of the plurality of user profiles to include the new data.

8. The method of claim 1, wherein the plurality of user profiles comprises a second supplemental profile.

9. The method of claim 8, comprising applying the second supplemental profile after a second start time associated with the second supplemental profile occurs.

10. The method of claim 9, wherein the second start time is subsequent to the end time associated with the supplemental profile.

11. The method of claim 10, comprising applying the default profile after a second end time associated with the second supplemental profile occurs.

12. A set-top box device, comprising:
a memory to store executable instructions; and
a processor coupled to the memory, wherein responsive to executing the instructions the processor performs operations comprising:
receiving data associated with each of a plurality of user profiles, wherein two of the plurality of user profiles comprise a default profile and a supplemental profile;
applying the default profile, wherein the default profile causes a first set-top box action that configures an electronic programming guide according to a default configuration of restricted and unrestricted channels responsive to an occurrence of an event;
receiving a request to activate the supplemental profile during a given time period having a start time and an end time based on input data corresponding to a selection, a placement, and an adjustment of a graphical indicator in a calendar interface of a graphical user interface, wherein the graphical indicator is a representation of the supplemental profile;
applying the supplemental profile when the start time associated with the supplemental profile occurs, wherein the supplemental profile causes a second set-top box action that configures the electronic programming guide according to a supplemental configuration of restricted and unrestricted channels responsive to the occurrence of the event, wherein the default configuration and the supplemental configuration differ;
terminating the default profile responsive to applying the supplemental profile when the start time occurs, thereby discontinuing the electronic programming guide being configured according to the default configuration;
restoring the default profile after the end time associated with the supplemental profile occurs, thereby restoring the electronic programming guide being configured according to the default configuration, and discontinuing the electronic programming guide being configured according to the supplemental configuration;
determining if the event occurred;
initiating one of the first set-top box action or the second set-top box action according to an active one of the default profile or the supplemental profile and responsive to determining that the event occurred; and terminating the first set-top box action previously initiated while the default profile was active responsive to the supplemental profile being activated, and the first set-top box action not being associated with the supplemental profile.

13. The set-top box device of claim 12, wherein the second set-top box action comprises instructing a digital video recorder coupled to the set-top box device to record a television program associated with the supplemental profile after the start time occurs, and wherein the first set-top box action comprises instructing the digital video recorder to record a second television program associated with the default profile before the start time or after the end time occurs.

14. The set-top box device of claim 12, further comprising a network interface to facilitate communication between the set-top box device and a video head-end equipment of a television service provider via an access network.

15. The set-top box device of claim 14, wherein the access network comprises a cable network, a satellite network, or an internet protocol television network.

16. The set-top box device of claim 14, wherein the operations further comprise:
    sending first profile information associated with the supplemental profile to the video head-end equipment and receiving a first television program recommendation based on the first profile information, when the event occurs after the start time associated with the supplemental profile; and
    sending second profile information associated with the default profile to the video head-end equipment and receiving a second television program recommendation based on the second profile information, when the event occurs before the start time or after the end time associated with the supplemental profile.

17. The set-top box device of claim 16, wherein the event occurs responsive to receiving a request for a television program recommendation, detecting a video-on-demand channel being accessed, detecting a pay-per-view preview channel being accessed, detecting an electronic program guide is being requested, or any combination thereof.

18. A non-transitory computer-readable medium, comprising computer instructions which, responsive to being executed by a processor, causes the processor to perform operations comprising:
    receiving data associated with each of a plurality of user profiles, wherein two of the plurality of user profiles comprise a default profile and a supplemental profile;
    applying the default profile, wherein the default profile causes a first set-top box action that configures an electronic programming guide according to a default configuration of restricted and unrestricted channels responsive to an occurrence of an event;
    receiving a request to activate the supplemental profile during a given time period having a start time and an end time based on input data corresponding to a selection, a placement, and an adjustment of a graphical indicator in a calendar interface of a graphical user interface, wherein the graphical indicator is a representation of the supplemental profile;
    applying the supplemental profile when the start time associated with the supplemental profile occurs, wherein the supplemental profile causes a second set-top box action that configures the electronic programming guide according to a supplemental configuration of restricted and unrestricted channels responsive to the occurrence of the event, wherein the default configuration and the supplemental configuration differ;
    terminating the default profile responsive to applying the supplemental profile when the start time occurs, thereby discontinuing the electronic programming guide being configured according to the default configuration;
    restating the default profile after the end time associated with the supplemental profile occurs, thereby restoring the electronic programming guide being configured according to the default configuration, and discontinuing the electronic programming guide being configured according to the supplemental configuration;
    determining if the event occurred;
    initiating one of the first set-top box action or the second set-top box action according to an active one of the default profile or the supplemental profile and responsive to determining that the event occurred; and
    terminating the first set-top box action previously initiated while the default profile was active responsive to the supplemental profile being activated, and the first set-top box action not being associated with the supplemental profile.

19. The non-transitory computer-readable medium of claim 18, wherein the operations further comprise:
    sending first profile information associated with the supplemental profile to a video head-end equipment and receiving a first television program recommendation based on the first profile information when a first recommendation event occurs after the start time associated with the supplemental profile; and
    sending second profile information associated with the default profile to the video head-end equipment and receiving a second television program recommendation based on the second profile information when a second recommendation event occurs after the end time associated with the supplemental profile.

20. The non-transitory computer-readable medium of claim 19, wherein the operations further comprise:
    receiving a first request for first television content associated with a television channel after the start time occurs;
    providing the first television content to a display device in response to the first request when the television channel is a first unrestricted channel according to the supplemental profile;
    denying access to the television channel in response to the first request when the television channel is a first restricted channel according to the supplemental profile;
    receiving a second request for second television content associated with a second television channel after the end time occurs;
    providing the second television content to the display device in response to the second request when the second television channel is a second unrestricted channel according to the default profile; and
    denying access to the second television channel in response to the second request when the second television channel is a second restricted channel according to the default profile.

* * * * *